United States Patent Office 3,323,892
Patented June 6, 1967

3,323,892
BROMOPYRIDAZONES AND PROCESS FOR REGULATING PLANT GROWTH
Franz Reicheneder, Ludwigshafen (Rhine), Germany, Karl Dury, deceased, late of Kirchheimbolanden, Germany, by Johanna Maria Dury, heiress-at-law, Kirchheimbolanden, Germany, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Dec. 1, 1965, Ser. No. 510,986
Claims priority, application Germany, Dec. 22, 1964, B 79,854
4 Claims. (Cl. 71—2.5)

The present invention relates to new bromopyridazone derivatives. It relates particularly to new bromopyridazone derivatives which are biologically active. It also relates to herbicidal mixtures containing the said derivatives and methods for controlling unwanted vegetation with the said derivatives.

It is an object of this invention to provide new pyridazone derivatives.

Another object is to provide pyridazone derivatives which are suitable for destroying plants.

A further object of the invention is to provide herbicidal mixtures which destroy unwanted plants without damaging crop plants.

Yet another object of the invention is to provide methods for selective weed control, i.e., for controlling weeds without damaging crop plants.

We have found that agents containing a new pyridazone derivative having the general formula

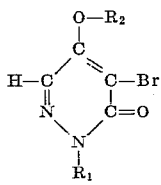

(in which $R_1$ denotes a phenyl or cyclohexyl radical which may bear a methyl group or a halogen atom, particularly a fluorine, chlorine or bromine atom, as a substituent and $R_2$ denotes a methyl radical, an ethyl radical or an acetyl radical) are suitable as selective herbicides. These agents are very well suited to weed control. A special advantage which they have over prior art pyridazone derivatives is their selective destruction of weeds growing among crop plants, the herbicides according to this invention exhibiting a marked action in this respect.

The pyridazone derivatives to be used according to this invention may be obtained using conventional methods, for example by reacting a 4,5-dibromopyridazone-(6) which is substituted in 1-position with an alkali or an alcoholate, or by reacting a 4-hydroxy-5-bromopyridazone-(6) which is substituted in 1-position with an alkyl chloride or an acyl chloride. Thus for example 1-phenyl-4-methoxy-5-bromopyridazone-(6) is obtained by reacting 1-phenyl-4,5-dibromopyridazone-(6) with an alcoholate, for example with sodium methylate in methanol. After 1-phenyl-4-methoxy-5-bromopyridazone-(6) has been recrystallized from alcohol, it has a melting point of 153° to 154° C.

Other active substances having the above general formula may easily be prepared in an analogous way.

The following may be given as examples of active substances in accordance with this invention:

| | M.P.,° C. |
|---|---|
| 1 - cyclohexyl - 4 - methoxy - 5 - bromopyridazone-(6) | 118 to 120 |
| 1 - phenyl - 4-methoxy - 5-bromopyridazone-(6) | 153 to 154 |
| 1-phenyl-4-ethoxy-5-bromopyridazone-(6) | 129 to 130 |
| 1 - phenyl - 4 - acetoxy - 5 - bromopyridazone-(6) | 116 to 117 |
| 1 - p - fluorophenyl-4-methoxy-5-bromopyridazone-(6) | 170 to 171 |

Selective herbicides in accordance with this invention may be applied in the conventional ways, alone or in admixture, as solutions, emulsions, suspensions or dusts. The form in which they are applied will depend on the purpose for which they are used. Whatever the form in which the herbicide is applied it should ensure a fine distribution of the active substance in use.

When carrier substances which are inert to plants are used, the selectivity of growth inhibition of the active substance is in some cases more clearly marked, for example in the selective control of weeds in crops of carrots.

For the production of solutions capable of direct spraying, for example mineral oil fractions having medium to high boiling point, such as kerosene or diesel oil, and also coal tar oils and oils of vegetable or animal origin, as well as cyclic hydrocarbons, such at tetrahydronaphthalene and alkylated naphthalenes, are suitable, to which the active substances according to this invention may be added, if necessary using suitable auxiliary solvents, for example xylene. Solutions in low boiling solvents, such as alcohols, ketones, ethers or low boiling point hydrocarbons or chlorinated hydrocarbons are less suitable for direct use but rather for combination with suitable emulsifying agents for the production of concentrates for the preparation of aqueous emulsions. Aqueous formulations are preferably emulsions or dispersions. The substances, as such or in one of the above- mentioned solvents, are homogenized in water, preferably by means of wetting or dispersing agents. Quaternary ammonium compounds may be given as examples of cationactive emulsifying or dispersing agents, and examples of anionactive dispersing agents are soaps, soft soaps, aliphatic long chain sulfuric acid monoesters, aliphatic or aromatic sulfonic acids, long chain alkoxyacetic acids, and examples of nonionic dispersing agents are polyethylene ethers of fatty alcohols and polyethylene oxide condensation products. On the other hand it is possible to prepare concentrates of active substance, emulsifiers or dispersing agent and if desired solvent, which may be diluted with water prior to use.

Dusts may be prepared by mixing or common grinding of the active substances with a solid carrier material, for example calcium carbonate, talc, diatomaceous earth, calcium phosphate, boric acid, flour, ground cork, carbon and other materials. The active substances may be applied to the carrier material by means of a volatile solvent. In this way granulates capable of being spread may be obtained.

The various forms of application may be adapted to various purposes in a conventional way by adding substances which improve distribution, adhesion, resistance to rain and penetrative power, such as fatty acids, resins, wetting agents, emulsifying agents, glue or alginates.

The spectrum of biological activity may also be broadened by adding bactericidal or fungicidal substances or plant growth regulants, and also by combining the active substances with fertilizers.

The following examples illustrate the effect of the agents according to this invention.

Example 1

Indian corn (*Zea mays*), barley (*Hordeum vulgare*), cotton (*Gossypium sp.*), peas (*Pisum sativum*), beans (*Phaseolus vulgaris*), annual meadow grass (*Poa annua*), wild foxtail (*Alopecurus myosuroides*), white goosefoot (*Chenopodium album*), chickweed (*Stellaria media*), camomile (*Matricaria chamomilla*), wild mustard (*Sinapis arvensis*) are sown in loamy sandy soil in plastics pots in a greenhouse. The surface of the test pots is then treated with 1-phenyl-4-methoxy-5-bromopyridazone-(6) (active substance I) and for comparison with 1-phenyl-4-methoxy-5-chloropyridazone-(6) (active substance II). The rate of application in each case is 2 kg./ha. of active substance dispersed in an amount of water equivalent to 500 1/ha. Four weeks later it is seen that with a good plant compatibility with respect to Indian corn, barley, cotton, beans and peas, active substance I has a stronger herbicidal action on dicotyledonous weeds and weed grasses than active substance II.

The results of the tests may be seen from the following table in which the effect ranges from 0=no damage to 100=total destruction:

TABLE 1

|  | Active substance | |
|---|---|---|
|  | I | II |
| Indian corn | 0 | 0 |
| Barley | 0–10 | 0–10 |
| Cotton | 0–10 | 0–10 |
| Peas | 0 | 0 |
| Beans | 0 | 0 |
| Annual meadow grass | 90–100 | 80 |
| Wild foxtail | 80–90 | 60 |
| White goosefoot | 90–100 | 80–100 |
| Chickweed | 100 | 80 |
| Camomile | 90–100 | 70–80 |
| Wild mustard | 90–100 | 80 |

The following substances have the same effect as I:

1-phenyl-4-ethoxy-5-bromopyridazone-(6),
1-phenyl-4-acetoxy-5-bromopyridazone-(6),
1-cyclohexyl-4-methoxy-5-bromopyridazone-(6) and
1-p-fluorophenyl-4-methoxy-5-bromopyridazone.

Example 2

The plants Indian corn (*Zea mays*), barley (*Horedum vulgare*), cotton (*Gossypium sp.*), peas (*Pisum sativum*), beans (*Phaseolus vulgaris*), annual meadow grass (*Poa annua*), wild foxtail (*Alopecurus myosuroides*), white goosefoot (*Chenopodium album*), chickweed (*Stellaria media*), camomile (*Matricaria chamomilla*) and wild mustard (*Sinapis arvensis*) are treated at a growth height of 3 to 14 cm. with 1-phenyl-4-methoxy-5-bromopyridazone-(6) (I) and, in comparison, with 1-phenyl-4-methoxy-5-chloropyridazone-(6) (II), in each case at a rate of application of 2 kg./ha. of active substance dispersed in an amount of water equivalent to 500 1/ha.

Three weeks later it is seen that I has a better herbicidal action on dicotyledonous weeds and weed grasses than II. The results of the test may be seen from the following Table 2 in which the effect ranges from 0=no damage to 100=total destruction.

TABLE 2

|  | Active substance | |
|---|---|---|
|  | I | II |
| Indian corn | 10 | 10 |
| Barley | 10 | 10 |
| Cotton | 0–10 | 0–10 |
| Peas | 0 | 0 |
| Beans | 0 | 0 |
| Annual meadow grass | 90 | 70–80 |
| Wild foxtail | 80 | 40–50 |
| White goosefoot | 90–100 | 80 |
| Chickweed | 90–100 | 80–90 |
| Camomile | 80 | 60–70 |
| Wild mustard | 90–100 | 90 |

What is claimed is:

1. A compound having the general formula

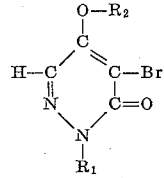

in which $R_1$ denotes a member selected from the group consisting of phenyl, cyclohexyl, phenyl substituted by methyl, fluorine, chlorine, or bromine, and cyclohexyl substituted by methyl, fluorine, chlorine, and bromine and $R_2$ denotes a member selected from the group consisting of methyl, ethyl and acetyl.

2. 1-phenyl-4-methoxy-5-bromopyridazone-(6).
3. 1-cyclohexyl-4-methoxy-5-bromopyridazone-(6).
4. A method for regulating plant growth by using a phytotoxic quantity of a compound as claimed in claim 1.

References Cited

FOREIGN PATENTS 168,062  9/1956  Australia.

NICHOLAS S. RIZZO, *Primary Examiner.*